May 9, 1961     G. W. GRAY     2,983,852
OBJECT DETECTION SYSTEM
Filed Oct. 31, 1957
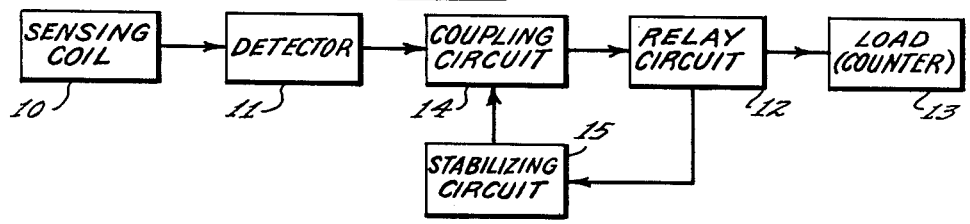
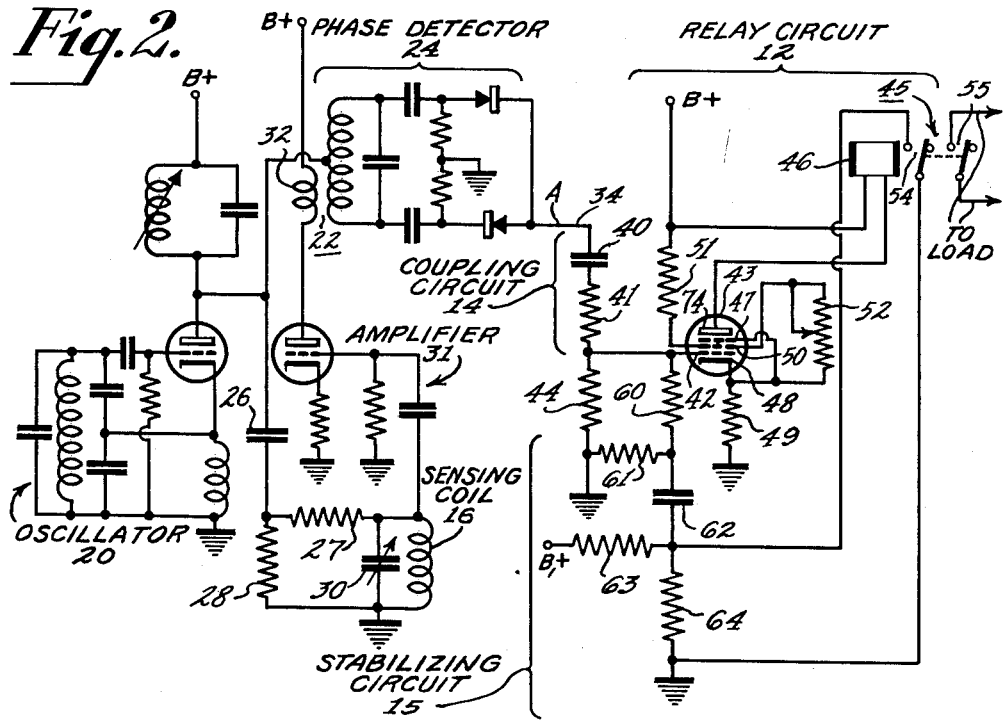
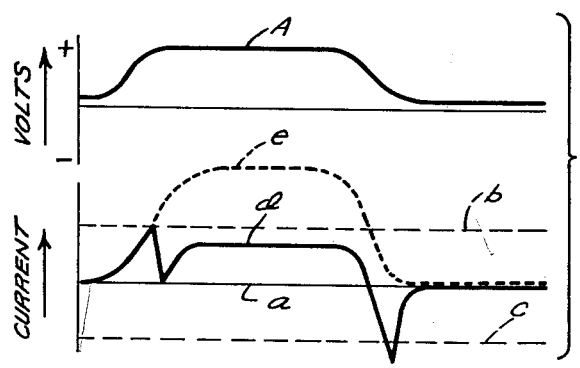
INVENTOR.
George W. Gray
BY
ATTORNEY.

United States Patent Office 2,983,852
Patented May 9, 1961

2,983,852
OBJECT DETECTION SYSTEM

George W. Gray, Lambertville, N.J., assignor to Radio Corporation of America, a corporation of Delaware Filed Oct. 31, 1957, Ser. No. 693,762

8 Claims. (Cl. 317—149)

The present invention relates to electronic object detection systems, and more particularly to object detection systems useful for control of vehicular traffic.

Object detectors are used for detecting and counting conductive or metal articles which may be transported on a conveyor belt past an inspection zone. For example, an object detector may be used to detect metal impurities in non-metallic objects. Means have long been sought for making electronic object detectors more reliable. Reliability is particularly important when the object detector is used in a system for controlling vehicular traffic. It will be appreciated that failure of an object detector to respond to a passing automobile in a vehicle actuated traffic control may have disastrous consequences.

Changes in ambient conditions around an electronic object detector may adversely affect the operation of the detector. For example, temperature changes or the presence of snow and ice may cause the parameters of the components in the object detector to change, thereby reducing the sensitivity of the detector and causing the detector to fail to respond to the passage of an object over the inspection zone.

Many electronic object detectors respond to the passage of a metallic object by exhibiting a measurable change in a parameter of an object sensing element. For example, an object detector may include a coil or inductor located at the inspection zone. The inductance of the coil decreases as an object to be detected comes in proximity thereto. The decrease of inductance, which may be reflected as a decrease in impedance or Q, may be used to produce a pulse signal. The leading edge of the pulse signal corresponds to the approach of the object into the inspection zone at which the coil is located, and the lagging edge of the pulse signal corresponds to the departure of the object from the inspection zone.

Changes in ambient or extrinsic conditions, such as in the temperature surrounding the inspection zone, may cause a variation in the effective impedance of the sensing coil. The presence of snow and ice around the coil may also cause changes in the effective impedance of the coil. Since temperature changes and the accumulation of snow and ice usually require an extended period of time, the variations in the impedance of the coil are relatively slow as compared to impedance changes caused by a passing object. The slow changes in impedance caused by extrinsic conditions may vary the amplitude of the pulse produced by the object detector when an object is sensed.

Previous devices were adapted to compensate for unwanted slow impedance changes. These have included circuits which cause a direct compensatory variation in the impedance of the coil in response to slow changes in the impedance thereof. Other circuits are designed to change the impedance of other circuits in the object detector which are associated with the sensing coil in a manner to produce a compensatory variation in the amplitude of the generated pulse signals. While these prior systems have been of substantial help in counteracting the adverse effects of changes in ambient conditions and have improved the reliability of electronic object detectors, further improvements, such as would reduce the complexity of the circuitry of the object detector, are desirable. The provision of simple devices for improving the reliability of electronic object detectors which may be used in vehicular traffic control has been difficult in that the detector must be sensitive to vehicles at the inspection zone regardless of the speed thereof. Thus, the detector must respond to rapidly moving vehicles with the same degree of sensitivity in which it responds to vehicles that may be stopped or stalled at an inspection point. It is desirable that the object detector indicate the length of time a vehicle remains in the inspection zone. Therefore, the information provided by the lagging edge of the pulse signal should be retained through the use of a reliability improving device.

It may be expected that unwanted variations in the impedance of the sensing element or other components may be reflected as slow changes or drift in the average value of the output signals from the detector. Thus, a utilization stage of the object detector may respond erroneously to an increase in the level of the output from the detector which is not produced by a pulse signal. The lagging edge of an actual pulse signal may differ from the leading edge to the extent that the utilization stage may not be capable to responding to the lagging edge. Therefore, an indication of the departure of an object from the inspection zone may not be produced or such an indication may be produced at the wrong time. Alternatively, the utilization stage may miss weak, low amplitude pulse signals.

It is a feature of the present invention to provide a circuit which responds only to the pulse signal, when it is changing in magnitude, so that the slow drift in the average values of the signals due to unwanted, extrinsic variations, will be eliminated. This circuit is unique in that it is responsive to pulse signals having a wide range of pulse duration, such as may be produced in an object detector in response to vehicles moving at almost every possible speed.

Another feature of the invention is to provide a circuit which cooperates with the circuit responsive to amplitude changes for completely isolating the utilization circuit from the detector circuits with respect to slow drift in the amplitude of the output signal from the detector circuits. This isolating circuit insures that the utilization circuit is maintained in condition to indicate a pulse signal throughout the duration of the pulse signal, and, therefore, the presence of an object or vehicle in the inspection zone.

Briefly described, the amplitude change responsive circuit may include a discharge circuit which is connected to the utilization stage. Means connected to the utilization stage and the discharge circuit are operative to cause the circuit to discharge in response to the leading edge of a pulse signal so as to provide a stabilization voltage at the input to the utilization circuit. On occurrence of the lagging edge of the pulse signal, the level of the voltage at the input to the utilization stage is adjusted by the circuit so that the utilization stage may respond to the lagging edge of the pulse signal in a manner opposite to its response to the leading edge of the pulse signal. Consequently, this amplitude change responsive circuit will be referred to herein as a stabilizing circuit.

The isolating circuit may include a component having an electrical transmission characteristic to isolate the input of the utilization stage from the object detection circuits for slow drift variations in the value of the output signal. Therefore, all slow drift variations that might occur between successive pulse signals are eliminated. Since the isolating circuit is connected between the object detection stages and the input of the utilization stage, it is referred to herein as a coupling circuit.

It is an object of the present invention to provide an improved object detection system.

It is a further object of the present invention to provide an improved object detector having simplified circuitry for improving the reliability thereof.

It is a still further object of the present invention to provide an improved object detector adapted for use in a vehicular traffic control system.

It is a still further object of the present invention to provide an electronic object detector having simplified circuitry for eliminating the adverse effects of slow impedance changes in the sensing element of the detector.

Other objects and advantages of the present invention will, of course, become apparent and immediately suggest themselves to those skilled in the art to which the invention is directed from a reading of the following description in connection with the accompanying drawing in which:

Fig. 1 is a schematic diagram, in block form, of an object detection system in accordance with the invention;

Fig. 2 is a circuit diagram of an object detection system of the type illustrated in Fig. 1; and Fig. 3 shows a plurality of curves which are illustrative of wave forms of current and voltage in different portions of the circuit shown in Fig. 2.

Referring to Fig. 1, a sensing coil 10 is coupled to a detector circuit 11. The sensing coil 10 may be a large coil located at an inspection zone. In a vehicle detection system the sensing coil 10 may comprise a few turns of wire which are embedded directly below the surface of the highway. For example, a circular or rectangular groove may be cut in the road. The distance between opposite sides of this groove may be as much as several feet. The turns of wire constituting the sensing coil 10 may be disposed within the groove. The groove may be filled with an insulating material, such as a tar, of the type that is normally used to repair the highway.

When a vehicle or other metallic or conductive object comes into proximity with the coil 10, the effective inductance and the impedance of the coil changes. This sensing coil is coupled to a detector 11. The detector 11 operates to provide an output which varies in accordance with the impedance of the sensing coil 10. When an object passes the inspection zone at which the sensing coil 10 is located, the voltage output of the detector changes from a normal magnitude and then returns thereto so that a pulse signal is produced. The leading edge of the pulse occurs when the object or vehicle enters the inspection zone, and the lagging edge of the pulse occurs when the object leaves the inspection zone. Various circuits may be used in the detector 11. For example, the detector may be an oscillator in which the sensing coil provides a part of the oscillatory circuit. When an object comes into proximity with the sensing coil, the current in portions of the oscillator changes. The direct current level of the current may increase. This increased current provides an output pulse signal.

Another circuit which may be used for the detector will be described in detail in connection with Fig. 2. This circuit includes a phase shifting network in which the sensing coil is a phase shift producing element. The change in the inductance of the sensing coil produces a phase shift which may be detected as an output pulse having a sense and magnitude which is a function of the sense and magnitude of the change in the impedance of the sensing coil from a quiescent value.

The output signal from the detector is applied to a utilization stage. For example, this stage may include electromagnetic devices for rejecting an object which has been found to contain a piece of unwanted or tramp metal. In vehicle control systems, the output signal from the detector may be used to control a warning signal generator, operate a traffic signal or the like. It will be particularly advantageous to include the object detection system of the present invention in a system for electronically controlling vehicles moving along a highway such as described generally in an article entitled, "The Electronic Highway," which appeared on page 51 of the October 21, 1957, issue of Newsweek magazine.

The utilization circuit, illustratively shown in Fig. 1, includes a relay circuit 12 which is coupled to a load device 13. The relay circuit 12 may include an electron tube having an operating winding of a relay in its plate circuit. Consequently, upon application of a pulse indicative of the detection of a metal object to the input of the tube, the relay may be caused to operate to pull in and actuate the load. The load may be a counter or a warning signal generator which is maintained in operated condition so long as a vehicle is in the inspection zone and/or for a certain time after the vehicle leaves the inspection zone. In a vehicle actuated traffic control system, the counter may be operative to control a traffic signal or the like in response to the number of vehicles passing the sensing coil 10 and detected by the system.

As was mentioned heretofore, it is desirable to provide an object detection system which is not sensitive to slow changes in the impedance of the sensing coil 10. Such slow changes may be caused by extrinsic conditions, such as the ambient temperature, accumulations of snow and ice, and variations of circuit parameters due to aging and exposure of components. While the sensitivity of the system to slow changes is undesirable, the sensitivity to objects passing the inspection point regardless of the speed at which such objects pass the inspection point, must be maintained. Thus, the system should respond with a high degree of sensitivity to the presence of an object, such as an automobile, which may be stopped or stalled on the sensing coil 10 in the inspection zone, as well as fast moving automobiles. An automobile which enters the inspection zone, for an extended period of time and thereafter leaves the inspection zone would cause the detector to produce an output pulse signal having a leading edge, a lagging edge, and a long interval therebetween. On the other hand, the detector would produce fast pulses for rapidly moving automobiles. The detector should provide a sensible signal indicating the presence of the vehicle so long as it is stopped at the inspection zone. However, it is desirable that the detector respond, when the vehicle leaves the inspection zone, to indicate the absence of a vehicle in the inspection zone. A coupling circuit 14 is provided to discriminate against slow drift in the value of the output signal from the detector 11 and thereby isolate the relay circuit 12 from the detector 11. This circuit 14 may be an alternating current coupling circuit capable of transmitting all but such slowly varying signals as might arise from changes in circuit parameters or temperature, and other extrinsic conditions. In other words, the time constant of the coupling circuit 14 will be long with respect to the duration of pulse signals due to even very slowly moving objects. Without the coupling circuit, the output signal from the detector might drift upwards in value to a value sufficient to operate the relay circuit 14. The contingency of erroneous indications due to slow drift caused by the conditions discussed above is therefore eliminated. The stabilizing circuit 15 is connected to both the coupling circuit 14 and the relay circuit 12. This stabilizing circuit 15 operates to adjust the voltage level at the output of the coupling circuit in response to signals from the relay circuit 12 so that the relay circuit may respond to changes in the magnitude of the output signal from the detector 11, regardless of the sense of the changes.

The operation of the cooperating coupling circuit 14, stabilizing circuit 15 and relay circuit 12 may also be understood by reference to the pulse signal which is generated by detector 11 in response to the presence of an object. The coupling circuit transmits the leading edge of the pulse signal because it is adapted to transmit a signal which changes rapidly in the magnitude. The relay circuit 12 will be operated on occurrence of the leading edge of the pulse signal. The relay 12 should remain operated so long as the pulse signal persists to indicate a stalled or stopped object (automobile) in the inspection zone. The relay should be permitted to recycle at the end of the pulse signal to indicate the departure and absence of an object in the inspection zone. The stabilizing circuit permits the relay to recycle on occurrence of the lagging edge of the pulse. The stabilizing circuit 15 is actuated when the relay circuit is operated. The level of the signal transmitted by the coupling circuit is adjusted by the stabilizing circuit to be intermediate the levels required to operate the relay circuit and to deactuate the relay circuit. Consequently, when the lagging edge of the pulse signal is transmitted by the coupling circuit 14, it will be operative to actuate the relay circuit 12. Since the stabilization circuit 15 does not transmit the signals, its operation is not affected by the frequency of the signals. Therefore, the system is able to respond equally as well to pulse signals, as may be produced by very fast or very slowly moving objects and vehicles.

Fig. 2 illustrates the coupling circuit 14, stabilizing circuit 15 and relay circuit 12 in greater detail. The components of the detector and the sensing coil are also included for the sake of completeness. The detector is of the phase sensitive type. It includes an oscillator 20 of conventional design. This oscillator 20 may produce continuous wave oscillations at several hundred kilocycles per second. A frequency of oscillation of three hundred kilocycles per second may be found suitable. The output signal from the oscillator 20 is applied to the center tap of a tuned input transformer 22 of a phase detector 24. The oscillator output signal is also applied over a phase changing network, including a capacitor 26 and two resistors 27 and 28, to the sensing coil 16. A variable capacitor 30 is connected across the sensing coil 16. The output signals from the sensing coil 16 are applied through an amplifier stage 31 to the phase detector 24. Sources of operating voltage for the oscillator 20 and amplifier 31 are illustratively designated at B+. Output signals from the amplifier 31 are applied to a coil 32 which provides a winding of the input transformer 22 of the phase detector 24. The variable capacitor 30 is adjusted so that the signals applied directly to the phase detector 24 from the oscillator 20 and the signals applied through the sensing coil 16 are substantially in quadrature. The phase detector 24 is similar to detectors employed in television circuits. Two inputs to the phase detector 24 are in push-push. When they are of equal amplitude and are in quadrature, the phase detector output voltage which is available at the lead 34 has a magnitude of zero volts. However, when the effective inductance of the sensing coil 16 changes so that the phase of the signal passing therethrough, which is applied to the phase detector 24, is changed, an output voltage appears at the lead 34. A typical output pulse signal from the phase detector, such as might occur upon the passage of an automobile over the sensing coil is illustrated by the wave form (A) in Fig. 3 of the drawings. The point in the circuit at which this wave form may be measured is also designated by the letter, "A."

The lead 34 which is at the output of the phase detector 24 is connected to the input of the relay circuit 12 through an alternating coupling circuit 14. In order to isolate the relay circuit 12 from the phase detector 24 for slow drift in the value of output signals from the detector 24, while all information signals are transmitted, the time constant of the coupling circuit should be large. This coupling circuit 14 therefore includes a capacitor 40 of relatively large value and a resistor 41. The resistors 44, 60 and 61 are associated with the capacitor 40. The value of this capacitor 40 may be 2 microfarads. The resistance due to the combination of the resistors 41, 44, 60 and 61 associated with the capacitor 40 and the capacitor 40 provides a time constant which is long as compared to the duration of any expected pulse signal from the detector 11.

This resistor 41 is connected to the grid 42 of an electron tube 43 in the relay circuit 12. A grid resistor 44 which is connected between a point of reference potential such as ground, and the grid 42 is also provided. A diode, such as a crystal diode having a low back resistance or another diode shunted by a resistor of a few megohms value, may be inserted between the grid 42 and grid resistor 44 with its anode connected to the grid 42 to block the flow of grid current. The plate 74 of the tube 43 is connected to a source of operating voltage, designated at B+, through the operating winding 46 of a relay 45. The screen grid 47 of the tube 43 is connected directly to the cathode 48. A cathode resistor 49 is connected between ground and the cathode 48. The screen grid 50 of the tube 43 is connected through a resistor 51 to the source of operating voltage B+. The screen grid 50 is also connected to the cathode 48 through a potentiometer 52. There is therefore provided a circuit for controlling the magnitude of the normal or quiescent current passing through the tube 43 from plate 74 to cathode 48 thereof by means of the potentiometer 52. Since the plate current through the tube 43 passes through the operating winding 46 of the relay 45, the quiescent current through the relay operating winding may be adjusted by use of the potentiometer 52. The quiescent current through the relay tube 43 is adjusted to a value such that the current through the relay operating winding 46 is insufficient to actuate the relay so as to cause the front contacts 54 and the back contacts 55 thereof to pull in, but greater than the minimum current required for the relay to become deactuated and to drop out after being actuated. This permits the relay to remain in pulled in condition until the current through the tube 43 drops below a certain relay drop out value.

The stabilizing circuit 15 may be considered to be connected to the output of the coupling circuit 14. This stabilizing circuit includes a pair of resistors 60 and 61. Resistor 60 is connected to the grid 42 of the relay tube 43. One end of the resistor 61 is connected to ground. The junction of the resistors 60 and 61 is connected to a capacitor 62. This capacitor 62 is connected, through a resistor 63, to another source of operating voltage shown at $B_1+$. The junction between the capacitor 62 and resistor 63 is also connected to ground through another resistor 64. The resistor 64 is connected between the front contacts 54 of the relay 45, and is adapted to be short-circuited when the contacts 54 close. The resistance of the resistors 44, 60, 61, 63 and 64 and the capacitance of the capacitor 62 are determinative of the charging time constant of the stabilizing circuit 15 while the capacitance of the capacitor 62 and the resistance of the resistors 44, 60 and 61 determine the discharge time constant of the stabilizing circuit 15. It will be desirable to select the values of the resistors 44, 60 and 61 and the capacitor 62 so that the discharge time constant is approximately equal to the time constant of the coupling circuit 14.

In operation, the leading edge of the output pulse signal from the phase detector 24 will be transmitted through the coupling circuit 14 to the grid 42 of the relay tube 43. This signal applies a positive voltage to the grid 42 thereby increasing the current through the relay tube 43 from the plate 74 to the cathode 48. This increased current is sufficient to operate the relay 45 and cause the contacts 54 and 55 thereof to close. Fig. 3 illustrates the wave form of the current through the relay operating winding 46. The base lines, designated by the letter (a), correspond to the magnitude of the quiescent current through the relay operating winding 46. The upper one of the horizontal dash lines, designated by the letter (b), indicates the magnitude of the current required for the relay 45 to pull in. The horizontal dash line, designated by the letter (c), is at the level to which the current through the relay operating winding 46 must fall before the relay 45 drops out.

Upon the transmission of the leading edge of the pulse signal through the coupling circuit 14, the current through the relay operating winding 46 increases sufficiently for the relay 45 to become energized and the contacts 54 and 55 to pull in. The curve shown in solid line, designated by the letter (d), illustrates the wave form of the current through the relay operating winding 46, when the system includes the coupling circuit 14 and stabilizing circuit 15 provided by the present invention. The wave form shown by a line constituted of short dashes and designated by the letter (e) illustrates the current through the relay operating winding in the event that the coupling circuit 14 were included, but, the stabilizing circuit 15 were eliminated.

Before the relay 45 is operated, the capacitor 62 will charge so that the side thereof connected to the grid 42 will assume a negative polarity. When the front contacts 54 pull in and close, the resistor 64 is short-circuited. Therefore, the value of the voltage applied to the capacitor 62 from the source $B_1+$ drops and a negative voltage is transmitted to the grid 42. In other words, the capacitor 62 discharges through the resistors 44, 61 and 60. Upon discharging, a bias voltage is developed across the resistor 61. This bias voltage is negative at the junction of the resistors 60 and 61 and, consequently, a negative bias is applied to the grid 42 of the relay tube 43. This negative bias reduces the current through the relay tube 43 so that the current through the operating winding 46 of the relay is reduced. However, because of the magnitude of the voltage $B_1+$ and the resistors 63 and 64, the voltage level at the grid 42 is not sufficient for the relay current to fall far enough to permit the relay 45 to drop out. This may be observed from wave form (d) of Fig. 3.

The stabilizing circuit 15 is operative to maintain the voltage level at the grid 42 of the relay tube 43 within a predetermined range for the entire duration of the pulse signal. It will be observed from the current wave form shown in Fig. 3 that the current through the relay tube 43 should be greater than the drop out level indicated by the dash line (c) so that the relay 46 will remain operated until the occurrence of the lagging edge of the pulse signal. However, since the current through the relay must drop below the drop out level due to the drop in grid voltage caused by the lagging edge of the pulse signal, the current level for the duration of the pulse signal must not exceed the drop out level (c) by the possible drop which may be caused by the lagging edge of the pulse signal. This current level must be maintained regardless of the speed of the object as it passes through the inspection zone. This is particularly important in cases where the object detection system is used in vehicular control systems. The system must respond to vehicles which might be stopped in the inspection zone as well as vehicles which pass over the inspection zone at high speeds, such as 60 miles an hour.

Taking the case of a vehicle stalled in the inspection zone, it will be noted that the relay 45 must be maintained in operative condition from the time after the vehicle enters the inspection zone until the time the vehicle leaves the inspection zone. This time may be indeterminate, and may be several minutes. As the vehicle enters the inspection zone the leading edge of the pulse signal will be transmitted through the coupling circuit 14 as a signal of positive polarity to the control grid 42 to permit the current through the relay operating winding 46 to increase sufficiently for the relay 45 to pull in. The capacitor 40 in the coupling circuit will therefore be charged to the maximum value of the pulse signal. Thereafter, the capacitor 40 will discharge. In the absence of the stabilizing circuit 15, the voltage at the grid 42 might drop sufficiently, while the vehicle is still in the inspection zone, to permit the current through the tube 42 to decrease below the drop out level (c). Of course, this would provide an erroneous indication of the departure of the vehicle from the inspection zone. The stabilizing circuit 15 insures that such erroneous indications will not take place.

After the relay 45 pulls in, the voltage at the grid 42 will drop to a value less than the value required to reduce the current to the drop out level (c) for the relay to drop out. Thereafter, the capacitor 62 begins to charge to ground potential through the resistors 44, 60 and 61. It will be observed that the charging of the capacitor 62 causes the voltage level at the grid 42 to increase while the discharging of the capacitor 40, causes the voltage at the grid 42 to decrease. As mentioned above, the time constant of the discharge circuit associated with the capacitor 62 is made approximately equal to the time constant associated with the capacitor 40. The change in voltage level at the grid 42 due to the capacitor 62 compensates for the voltage level change due to the discharge of the capacitor 40. Therefore, the voltage level at the grid 42 is maintained substantially constant for the duration of the pulse signal. The voltage at the grid 42 cannot decrease to an extent which will permit the current through the tube 43 and relay operating winding 46 to decrease below the level (c) for the relay 45 to drop out.

For vehicles which travel at high speed and pass rapidly over the inspection zone, a very short pulse signal is produced by the phase detector 24. Because of the large capacitance of the capacitor 40, the entire short pulse passes through the coupling circuit 14 without substantial attenuation. The leading edge of the pulse will be sufficient to raise the voltage level at the grid 42 and permit the tube 43 to pass enough current through the relay operating winding 46 for the relay 45 to pull in. However, the pulse voltage level will be maintained for the duration of the pulse and the lagging edge of the pulse signal will not cause the current through the tube 43 to drop below the level (c) for relay drop out. The stabilizing circuit 15 insures that the voltage level at the grid will drop after the occurrence of the leading edge of the pulse signal. As was pointed out above, a negative voltage impulse is transmitted to the grid 42 when the relay 45 pulls in. Therefore, the voltage level at the grid 42 drops instantaneously. The capacitor 62 charges toward ground potential at a slow rate so that the voltage at the grid 42 does not rise significantly. Consequently, the current through the relay tube, from plate to cathode is not increased significantly. When the lagging edge of the pulse signal is transmitted through the coupling circuit 14, this signal appears as a negative voltage on the grid 42 of the tube 43. This negative voltage is sufficient to decrease the current through the tube 43 to an extent that the current through the relay operating winding falls below the level, indicated by the line (c) in Fig. 3, for the relay 45 to drop out. Upon dropping out, the contacts 54 and 55 open and the circuit is available for response to another object (another vehicle).

The back contacts 55 of the relay 45 may be connected to the load 13, such as a counter for providing the vehicle control functions mentioned above.

Wave form (e) illustrates the effect of the stabilizing circuit. In the absence of the stabilizing circuit, the capacitor 40 would be permitted to charge when pulse signals are applied thereto. Therefore, the voltage level at the grid 42 remains high. Consequently, when the lagging edge of the pulse appears it is insufficient in reducing the voltage level at the grid 42 of the tube 43 to an extent sufficient to cause a reduction of the current through the tube. It follows that the relay current would not be sufficiently decreased at the end of a signal pulse to permit the relay 45 to drop out. The detector would therefore be incapable of indicating when an object or an automobile leaves the inspection point.

What is claimed is:

1. In combination, a relay, means for controlling the current through said relay in response to control signals of one character for actuating said relay and of another character for deactuating said relay, an alternating current coupling circuit for transmitting said signals to said control means while blocking the flow of direct current thereto, and means operative upon closing of said relay for making said control means unresponsive except for said control signals for deactuating said relay.

2. In combination, a signal responsive control device having an actuated and deactuated condition of operation, means for applying a control signal to said device of a first value for actuating said device in response to an input signal of one polarity and a control signal of a second value for deactuating said device in response to an input signal of opposite polarity, a coupling circuit including a capacitor connected to said last-named means for transmitting pulses of said one polarity thereto to provide said input signal of one polarity, and a stabilizing circuit connected to said first-named means and operative in response to actuation of said control device by the leading edge of one of said transmitted pulses for applying an input signal thereto of opposite polarity and magnitude equal to the magnitude of said one transmitted pulse whereby said control device will be deactuated upon occurrence of the lagging edge of said one transmitted pulse.

3. The invention as set forth in claim 2 wherein said stabilizing circuit includes a capacitor, and the time constant of the circuit associated with said capacitor in said coupling circuit being approximately equal to the time constant of the discharge circuit associated with said capacitor in said stabilizing circuit.

4. A circuit for operating a relay comprising an amplifying device for controlling the operating current for said relay in response to input signals thereto, a coupling circuit including a capacitor for applying pulse signals to said device of polarity for increasing said operating current for said relay, a stabilizing circuit including a capacitor connected to the input of said device for applying a voltage thereto opposite in polarity to said signal from said coupling circuit, said stabilizing circuit including means for charging said stabilizing circuit capacitor, and means operated by said relay for discharging said stabilizing circuit capacitor.

5. A circuit as set forth in claim 4 wherein the discharge circuit associated with said stabilizing circuit capacitor and the circuit associated with said coupling circuit capacitor have approximately equal time constants.

6. An object detector including a sensing circuit for providing a pulse signal of one polarity when an object is detected comprising a utilization stage including an electron tube having a plate, a cathode and a control grid, a relay having an operating winding and a plurality of contacts adapted to close when said relay is energized, said operating winding being connected in the plate circuit of said tube, a coupling circuit including a capacitor connected between said sensing circuit and said grid of said tube, a discharge circuit including another capacitor connected to said grid of said tube, means for charging said other capacitor to a predetermined voltage, and means including a pair of contacts of said relay for discharging said other capacitor so that a voltage having a polarity opposite to the polarity of said pulse signal is applied to said grid.

7. An object detector comprising an object sensing circuit which provides a pulse signal of one polarity, a utilization stage including a bistable circuit having an input and an output, said bistable circuit also having a normal state of operation and being adapted to assume another state of operation in response to a pulse signal of one polarity, said bistable circuit being returnable to said normal state of operation upon application of a pulse signal of opposite polarity thereto, an alternating current coupling circuit including a capacitor presenting an impedance characteristic to block very slow signal amplitude variations connected between said input of said bistable circuit and said sensing circuit, said coupling circuit being adapted to transmit said pulse signal for changing said operative state of said bistable circuit upon occurrence thereof, a stabilizing circuit including a capacitor connected to the input of said bistable circuit, and means operative upon a change in state of said bistable circuit for discharging said last named capacitor to provide an instantaneous voltage of polarity opposite to the polarity of the said pulse signal to said input whereby said bistable stage will be returned to said normal state upon termination of said pulse signal.

8. An object detector comprising a sensing coil, a phase detector having an input and an output, an oscillator for generating a high frequency signal, said oscillator being connected to the input of said phase detector and to said sensing coil, means for applying oscillations transmitted from said sensing coil to said input of said phase detector, said sensing coil being disposed in an inspection zone for detecting an object in said zone, a relay having an operating winding and two pairs of contacts, one of said pairs of contacts being adapted to be connected to a device for indicating the presence of an object in said inspection zone, an electron tube having a plate, cathode and control electrode, said plate being connected through said operating winding to a source of operating voltage, a resistor connected to said cathode, another resistor connected between said cathode and said source of operating voltage for applying a predetermined voltage across said cathode for providing a quiescent current through said tube and said relay operating winding, the magnitude of said current being between the current magnitude for relay pull-in and relay drop out, a circuit including a capacitor for coupling the output of said phase detector to said control electrode, and another circuit connected to said control electrode for stabilizing the voltage at said control electrode, said stabilizing circuit including a capacitor, a resistance network connecting said last-named capacitor to said control electrode, a resistor connecting the side of said last-named capacitor opposite from the side thereof connected to said control electrode to another source of operating voltage for charging said last-named capacitor, one of said pair of relay contacts being connected across at least a portion of said last-named resistor for discharging said last-named capacitor upon pull-in of said relay.

References Cited in the file of this patent

UNITED STATES PATENTS

| | | |
|---|---|---|
| 2,165,048 | Gullinksen | July 4, 1939 |
| 2,443,122 | Smith | June 8, 1948 |
| 2,629,826 | McIlvaine et al. | Feb. 24, 1953 |
| 2,685,665 | Price | Aug. 13, 1954 |
| 2,708,746 | Shaw | May 17, 1955 |
| 2,721,994 | Brown | Oct. 25, 1955 |
| 2,735,009 | Harry | Feb. 14, 1956 |
| 2,767,393 | Bango | Oct. 16, 1956 |
| 2,884,594 | Ludvigsen | Apr. 28, 1959 |